US011975625B2

(12) United States Patent
MacDonald

(10) Patent No.: US 11,975,625 B2
(45) Date of Patent: May 7, 2024

(54) CABLE SUPPORT

(71) Applicant: Nodum Industries Ltd., London (GB)

(72) Inventor: Benjamin Hector MacDonald, London (GB)

(73) Assignee: NODUM INDUSTRIES LTD., London (GB)

(*) Notice: Subject to any disclaimer, the term of this patent is extended or adjusted under 35 U.S.C. 154(b) by 36 days.

(21) Appl. No.: 17/639,186

(22) PCT Filed: Sep. 3, 2020

(86) PCT No.: PCT/EP2020/074586
§ 371 (c)(1),
(2) Date: Feb. 28, 2022

(87) PCT Pub. No.: WO2021/043897
PCT Pub. Date: Mar. 11, 2021

(65) Prior Publication Data
US 2022/0324344 A1 Oct. 13, 2022

(30) Foreign Application Priority Data

Sep. 3, 2019 (GB) ..................... 1912658

(51) Int. Cl.
*B60L 53/35* (2019.01)
*B60L 53/18* (2019.01)
(Continued)

(52) U.S. Cl.
CPC ............. *B60L 53/35* (2019.02); *B60L 53/18* (2019.02); *F16M 13/02* (2013.01); *H02G 3/26* (2013.01);
(Continued)

(58) Field of Classification Search
CPC ......... B60L 53/35; B60L 53/18; F16M 13/02; H02G 3/26; H02G 11/00
(Continued)

(56) References Cited

U.S. PATENT DOCUMENTS

| 4,157,194 A * | 6/1979 | Takahashi | F16L 9/127 |
| | | | 285/332 |
| 4,703,832 A * | 11/1987 | Fontenot | A62B 1/20 |
| | | | 182/189 |

(Continued)

FOREIGN PATENT DOCUMENTS

| CN | 201323225 Y | 10/2009 |
| CN | 202395469 U | 8/2012 |

(Continued)

OTHER PUBLICATIONS

International Search Report and Written Opinion issued by the International Searching Authority in related International Patent Application No. PCT/EP2020/074586, dated Dec. 2, 2020.
(Continued)

*Primary Examiner* — Todd M Epps
(74) *Attorney, Agent, or Firm* — ArentFox Schiff LLP

(57) ABSTRACT

A cable support comprises an elongate supporting structure configured for attachment to a vertical surface. The cable support comprises a boom arm for supporting a cable wherein the boom arm is arranged to slide along at least a portion of the elongate supporting structure. The cable support further comprises a slidable pivot for supporting the boom arm. When deployed, the boom arm slides down along at least a portion of the elongate supporting structure as the boom arm rotates outwards from the supporting structure to provide lateral support for the cable. The slidable pivot
(Continued)

supports the boom arm by sliding downwards along the length of the supporting structure during deployment of the boom arm.

19 Claims, 11 Drawing Sheets

(51) Int. Cl.
    *F16M 13/02*     (2006.01)
    *H02G 3/00*     (2006.01)
    *H02G 11/00*     (2006.01)

(52) U.S. Cl.
    CPC ......... *H02G 11/00* (2013.01); *F16M 2200/06* (2013.01)

(58) Field of Classification Search
    USPC .......................................................... 248/70
    See application file for complete search history.

(56) References Cited

U.S. PATENT DOCUMENTS

| | | | |
|---|---|---|---|
| 5,587,115 A * | 12/1996 | Allen | G02B 6/508 |
| | | | 264/209.3 |
| 6,338,450 B1 * | 1/2002 | Schwendinger | B60L 53/31 |
| | | | 191/12 R |
| 2006/0196032 A1 | 9/2006 | Schmidt | |
| 2010/0060016 A1 | 3/2010 | Hunter | |
| 2010/0102775 A1 | 4/2010 | Chander et al. | |
| 2010/0283426 A1 | 11/2010 | Redmann | |
| 2012/0032635 A1 | 2/2012 | Prosser et al. | |
| 2013/0257373 A1 | 10/2013 | Mallon, IV et al. | |
| 2015/0042278 A1 | 2/2015 | Leary | |
| 2018/0086216 A1 | 3/2018 | Rodriguez | |
| 2018/0339600 A1 | 11/2018 | Kang | |

FOREIGN PATENT DOCUMENTS

| | | |
|---|---|---|
| CN | 104241948 A * | 12/2014 |
| CN | 104659710 A | 5/2015 |
| CN | 104967188 A | 10/2015 |
| CN | 105186612 A | 12/2015 |
| CN | 205385326 U | 7/2016 |
| CN | 205509450 U | 8/2016 |
| CN | 106218435 A | 12/2016 |
| CN | 106374590 A | 2/2017 |
| CN | 206254818 U | 6/2017 |
| CN | 107244253 A | 10/2017 |
| CN | 107351707 A | 11/2017 |
| CN | 107499158 A | 12/2017 |
| CN | 206968423 U | 2/2018 |
| CN | 207128662 U | 3/2018 |
| CN | 207403915 U | 5/2018 |
| CN | 207565358 U | 7/2018 |
| CN | 207916597 U | 9/2018 |
| DE | 102009024721 A1 | 12/2010 |
| DE | 202011100062 U1 | 11/2011 |
| DE | 202014005149 U1 | 7/2014 |
| DE | 102014109068 A1 | 12/2015 |
| DE | 202017100795 U1 | 4/2017 |
| DE | 202017103306 U1 | 9/2018 |
| DE | 102017010446 A1 | 5/2019 |
| EP | 0073824 A1 | 3/1983 |
| EP | 0264102 A1 | 4/1988 |
| EP | 0552736 A1 | 7/1993 |
| EP | 0846651 A1 | 6/1998 |
| EP | 1705050 A1 | 9/2006 |
| EP | 1983110 A2 | 10/2008 |
| EP | 2406099 A2 | 1/2012 |
| EP | 2480480 A1 | 8/2012 |
| EP | 2551145 A2 | 1/2013 |
| EP | 2852024 A1 | 3/2015 |
| EP | 2888128 A1 | 7/2015 |
| EP | 3140151 A1 | 3/2017 |
| EP | 3160792 A1 | 5/2017 |
| EP | 3312044 A1 | 4/2018 |
| EP | 3412497 A1 | 12/2018 |
| EP | 3441256 A1 | 2/2019 |
| EP | 3459785 A1 | 3/2019 |
| FR | 2967527 A1 | 5/2012 |
| GB | 2503229 A | 12/2013 |
| JP | 2012090407 A | 5/2012 |
| JP | 2012095425 A | 5/2012 |
| JP | 2015053811 A | 3/2015 |
| KR | 200387785 Y1 | 6/2005 |
| KR | 200429497 Y1 | 10/2006 |
| KR | 20080012586 A | 2/2008 |
| KR | 20130060156 A | 6/2013 |
| KR | 20180065844 A | 6/2018 |
| KR | 101883385 B1 | 7/2018 |
| KR | 20180128557 A | 12/2018 |
| WO | WO 2009/001788 A1 | 12/2008 |
| WO | WO 2011/090769 A1 | 7/2011 |
| WO | WO 2012/110064 A2 | 8/2012 |
| WO | WO 2012/122072 A2 | 9/2012 |
| WO | WO 2012/142695 A1 | 10/2012 |
| WO | WO 2013/169895 A1 | 11/2013 |
| WO | WO 2016/008045 A1 | 1/2016 |
| WO | WO 2017/215606 A1 | 12/2017 |
| WO | WO 2019/096663 A1 | 5/2019 |

OTHER PUBLICATIONS

"Chargestorm to preview new DC charging station for urban environments at Hannover Messe", https://chargestrom.se/en/chargestorm-to-preview-new-dc-charging-station-for-urban-environments-at-hannover-messe/, retrieved Mar. 29, 2019.
Combined Search and Examination Report issued by United Kingdom Intellectual Property Office in related United Kingdom Patent Application No. GB1912658.0, dated Feb. 28, 2020.

* cited by examiner

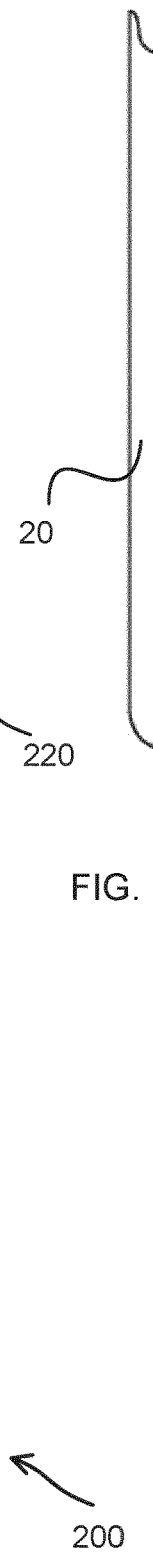
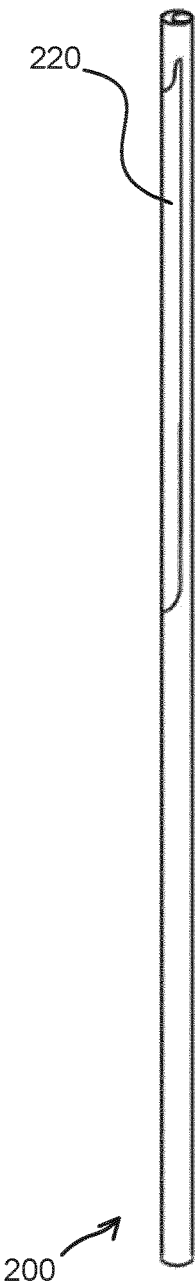
FIG. 14b
FIG. 14d
FIG. 14a
FIG. 14c

CABLE SUPPORT

CROSS-REFERENCE TO RELATED APPLICATIONS

The present Application for Patent is a National Stage Entry of International Patent Application No. PCT/EP2020/074586, filed Sep. 3, 2020, which claims priority to United Kingdom Patent Application No. GB 1912658.0, filed Sep. 3, 2019. The disclosure of the priority applications are incorporated in their entirety by reference herein.

TECHNICAL FIELD

The present disclosure relates to a cable support and particularly, but not exclusively, to a cable support for a charging cable of a vehicle. Aspects of the invention relate to a support, a pipe and a system.

BACKGROUND

Recently, the popularity of electric vehicles (EVs) has been rising. In order to accommodate the demands of the EVs, developments and investments in supporting infrastructures became essential. One of the main areas of development is EV charging. Charging stations have been built at designated areas. Charging units have been installed at individual houses and on streets. These charging units, especially but not limited to, the ones installed at individual houses and on streets, need to be compact and easily operable so that they have minimum impact on the usage on the land they are installed. Presently these electric charging units resemble that of fueling units at petrol station. They require designated areas and the charging unit needs to be erected at a designated position with the cables housed inside the charging unit taking up a particular part of the area and, although removable, will be a permanent fixture on that location until foreseeable future. Locating a suitable electric vehicle charging station is particularly problematic for terraced houses which use street parking such as are often found in larger cities in some countries Some of the charging units may be installed on a wall. These wall-mounted charging units can easily interfere with the user's general activities around its location and become unusable if there are obstacles along its way to reach an EV.

It is an aim of the present invention to address disadvantages associated with the prior art.

The embodiments described below are provided by way of example only and are not limiting of implementations which solve any or all of the disadvantages of known prior art.

SUMMARY OF INVENTION

Aspects and embodiments of the invention provide a support, a pipe and a system as claimed in the appended claims.

According to an aspect of the invention, there is provided a cable support comprising: an elongate supporting structure configured for attachment to a vertical surface; a boom arm for supporting a cable, wherein the boom arm is arranged to slide along at least a portion of the elongate supporting structure and is deployed for use by sliding down along at least a portion of the elongate supporting structure as the boom arm rotates outwards from the supporting structure to provide lateral support for the cable; and a slidable pivot for supporting the boom arm and sliding downwards along the length of the supporting structure during deployment of the boom arm. In this way, the radius of movement of the boom arm is minimised whilst providing support for the cable during its usage and storage. Due to minimised radius of movements and direction of the movements, the boom arm can avoid obstacles such as wires, tree branches, any overhanging obstacles or the like.

In at least one embodiment, the cable support is configured to support an electrical cable for charging an electric vehicle. The cable to charge an electric vehicle parked within the proximity of the building can be easily operable, during usage and compactly stored away.

In at least one embodiment, the slidable pivot supports the boom arm and slides upwards along at least a portion of the elongate supporting structure as the boom arm rotates inwards towards the supporting structure. In this way, the boom arm can retract with minimised radius of movement such that during the retraction the boom arm can avoid obstacles. For retraction, the boom arm may trace back the radius of movement during its deployment.

In at least one embodiment, the rate at which the boom arm extends and retracts laterally as the boom arm slides along the supporting structure is adjustable. In this way, the movement of the boom arm is more controllable so that it can avoid obstacles in a more dynamic manner In at least one embodiment, the cable support comprises a boom support, wherein the boom support is attachable to the vertical surface and/or the elongate supporting structure and is connected to a distal end of the boom arm supporting the boom arm in various positions. In this way, further support is provided to support the weight of the boom arm and the cable. This also allows the radius of movement of the boom arm to be more secure while it is moving (i.e. either being deployed or retracted) and when it is fully extended (i.e. fully deployed).

In at least one embodiment, the cable support comprises a first guide which is disposed on the boom arm, wherein the first guide is arranged to support the movement of the cable during the deployment and retraction of the boom arm. The first guide may be disposed at the distal end of the boom arm. A plurality of the first guide may be disposed along the length of the boom arm. The first guide may be a roller. The first guide reduces friction caused by the cable moving inside the cable support. The roller provides further ease of releasing the cable and guiding the cable along a desired path.

In at least one embodiment, the cable support comprises a second guide which is disposed on the slidable pivot, wherein the second guide is arranged to support the movement of the cable during the deployment and retraction of the boom arm. The second guide may be a pulley or a roller. The second guide reduces friction caused by the cable moving pass an apex created by the way the cable is stored within the cable support. The second guide also reduces the friction caused by the cable being bent due to the limited space within the cable support. The roller aids in feeding the cable in a passive and smooth manner. The pulley provides a mechanism to actively feed the cable through relevant parts of the cable support (such as the boom arm and the elongate member) during the deployment and retraction of the boom arm.

In at least one embodiment, the cable support comprises a driving mechanism which is arranged to provide means to move the slidable pivot along at least the portion of the elongate supporting structure such that the boom arm is deployed and retracted. The driving mechanism may comprise a self-belt retractor or a motorised lead screw. In this way, the boom arm is deployed and retracted in a more efficient and controllable manner.

In at least one embodiment, the cable support comprises a housing which encloses the cable support such that the elongate supporting structure, the boom arm and the slidable pivot are enclosed within the housing when the boom arm is stowed. In this way, the cable support is protected from environmental factors and unnecessary damages. The housing also provides compact storage for the cable support and the cable, keeping the area neat and aesthetically pleasing.

In at least one embodiment, the housing comprises a cavity for storing at least a portion of the cable. In this way, excess cables can be stored under a cover, protected from the environment. The housing may be an integral portion of a pipe. The cable support may be enclosed within a pipe. The pipe may be used as a drainage pipe for a building as well as used to provide a cover for the cable support and the cable.

In at least one embodiment, the cable support comprises one or more magnetic elements which are disposed along the elongate support structure. The cable support may comprise one or more magnetic element which are disposed along the inside of the housing of the cable support. In this way, the cable is temporarily disposed at a predetermined location such that excess length of the cable is not displaced. This ensures the cable is not entangled, bent or exposed to the environment unnecessarily.

In at least one embodiment, the deployment and/or retraction of the boom arm is manually or automatically controllable. In at least one embodiment, the deployment and/or retraction of the boom arm is remotely controllable. The deployment and/or retraction of the boom arm may be controlled by an electronic device. The electronic device may comprise a fob, a mobile device, a laptop, a tablet, a wearable electronic device such as smart watches, or the like and a vehicle user interface. In this way, the cable support provides many different ways to activate the cable support so that the boom arm can be deployed and retracted accommodating different situations and users' preferences.

According to a further aspect of the invention, there is provided a pipe for drainage comprising the cable support as described in any one of the preceding paragraphs. A pipe for drainage may be arranged to store a cable.

According to a further aspect of the invention, there is provided a system for charging an electric vehicle comprising: a cable comprising a connector, the connector is configured to couple with a vehicle and deliver electrical charges to the vehicle; and a cable support comprises: an elongate supporting structure configured for attachment to a vertical surface; a boom arm for supporting a cable, wherein the boom arm is arranged to slide along at least a portion of the elongate supporting structure and is deployed for use by sliding down along at least a portion of the elongate supporting structure as it rotates outwards from the supporting structure to provide lateral support for the cable; a slidable pivot for supporting the boom arm and slides downwards along the length of the supporting structure during deployment of the boom arm. In this way, EV can be charged conveniently and safely near a building or a similar type of upright structure found in a street environment, such as a lamp-post, with a charging unit which is simple and compact, and when not in use, out of the user's way. Furthermore, this enables the support to clear any over-hanging wires, (i.e. telephone and power cables feeding to buildings), structures or tree branches. This also ensures that the cable is cleared away, not lying around on the floor. In some embodiments, a system for charging an electric vehicle comprises the cable support as described in the preceding paragraphs.

Some embodiments of the system are configured to provide a secure stow away of the cable when not in use preventing access to unauthorised users. Some embodiments also allow the cable to be supported in use when deployed over a footpath or pavement running along a road at a sufficient height over the kerbside to allow pedestrian access underneath the supporting boom whilst the vehicle is charging, providing a safer deployment environment. Although the supporting boom may be first lowered to a height at which the cable can be reached to extend the cable from the boom to reach the charging point on the vehicle, after this the boom may be raised whilst the vehicle remains charging so that pedestrians can continue to pass underneath.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible, even if there is no direct pointer provided to accompany such a combination, and especially if such a combination would be apparent upon reading this specification. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 14a-d show diagrams of a pipe and the cable support according to at least one embodiment of the present invention.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Figure 1:
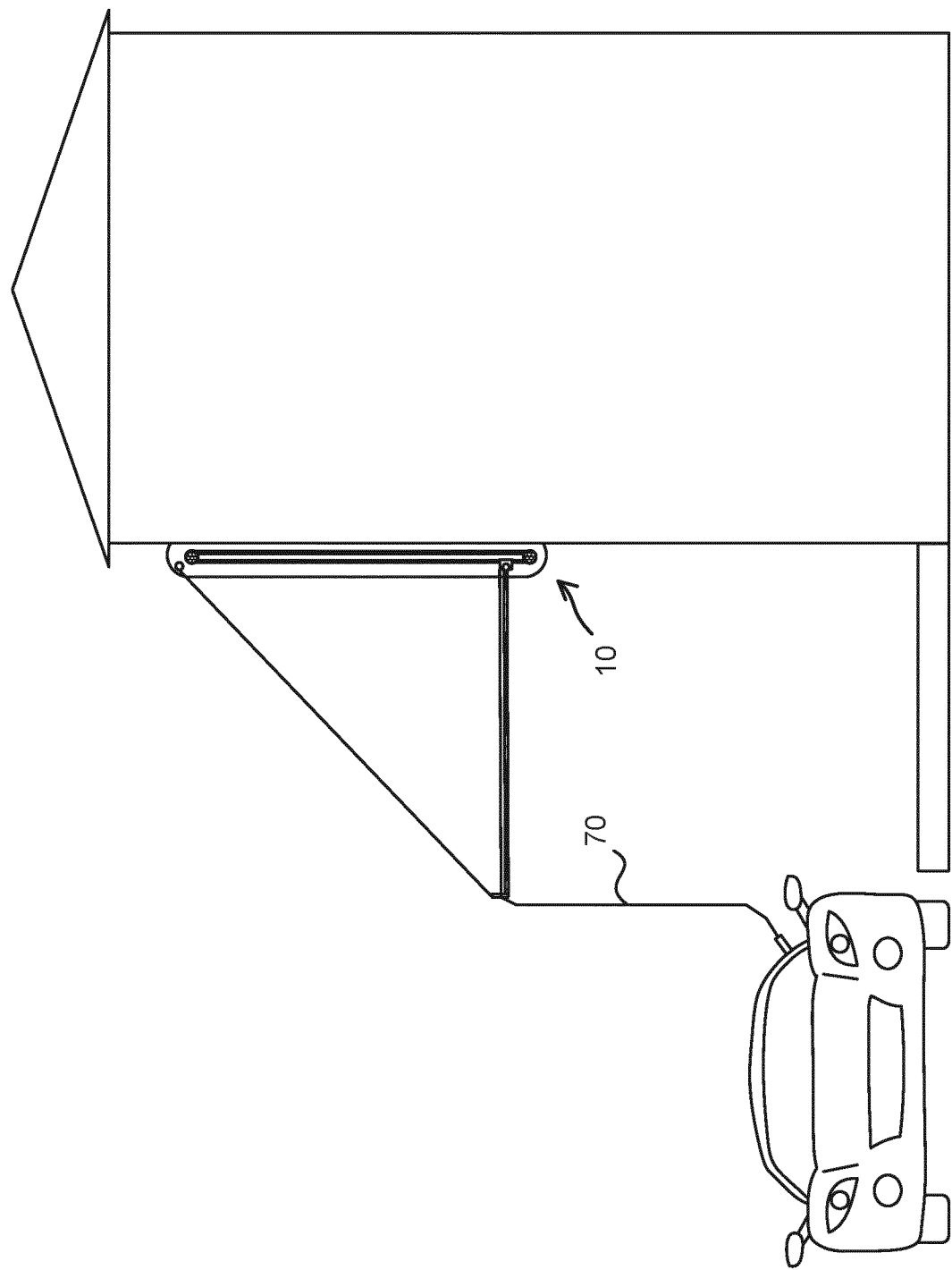
FIG. 1 shows a cable support in use according to at least one embodiment of the present invention.
Figure 3:
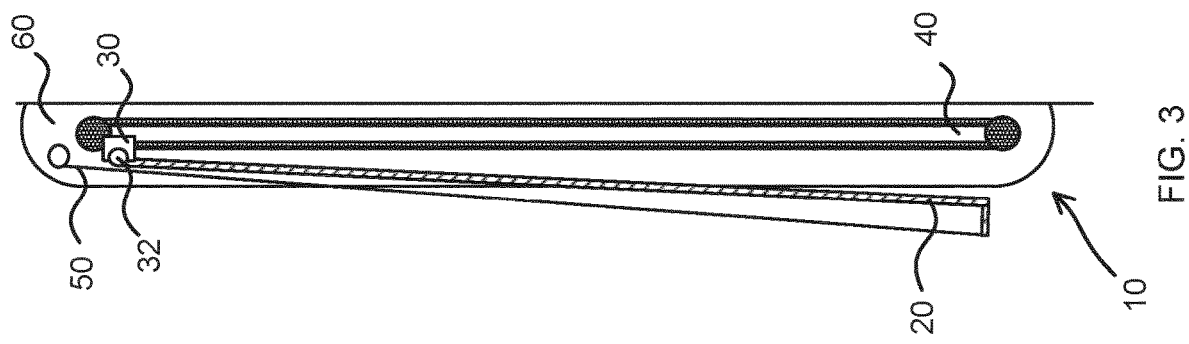
FIGS. 2 to 5 show deployment and retraction of a cable support according to at least one embodiment of the present invention.
Figure 15:
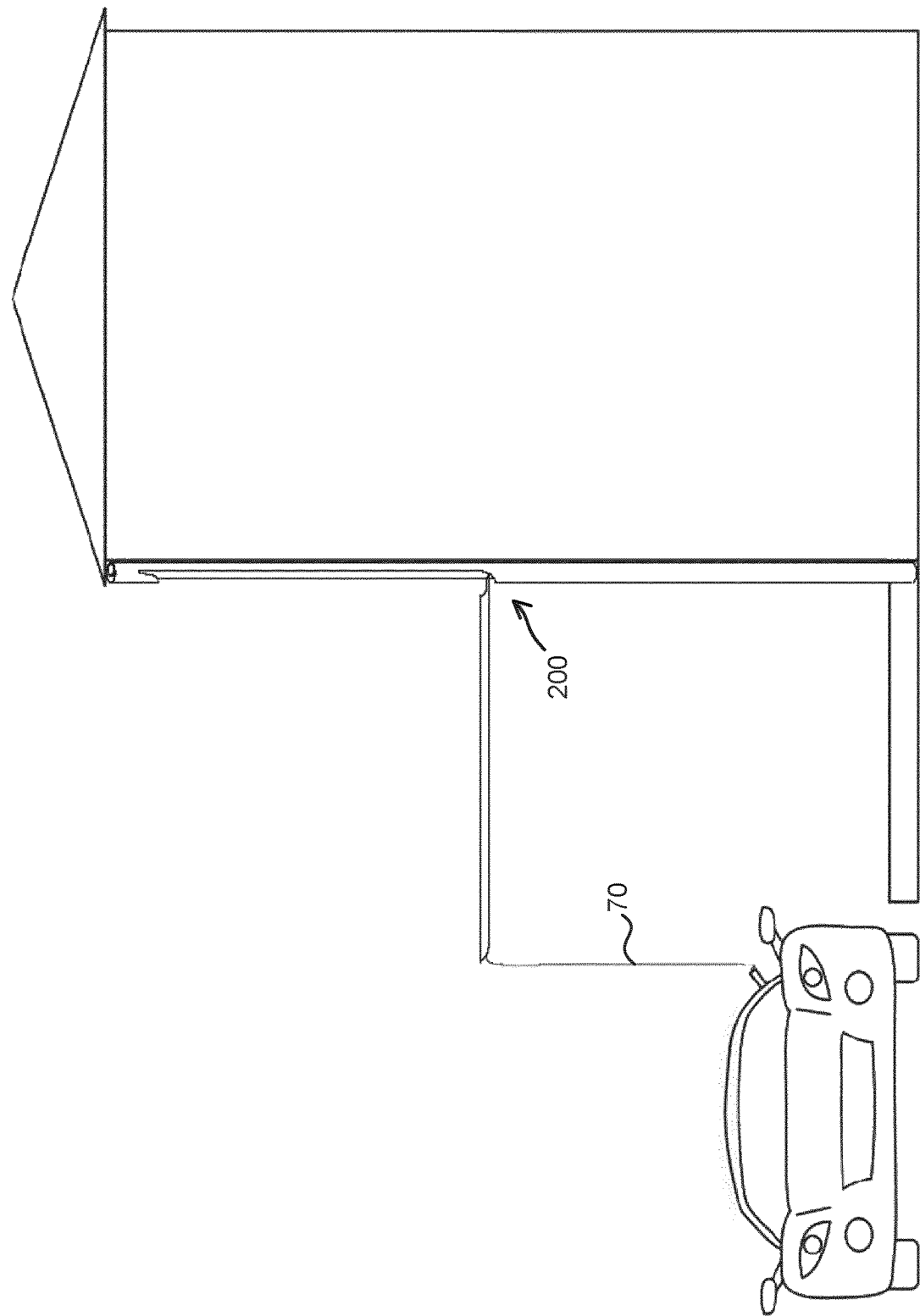
FIG. 15 shows the cable support within the pipe in use according to at least one embodiment of the present invention.

FIGS. 1 and 15 show a cable support 10 being in use and aiding to support a cable 70 to reach a vehicle located at a distance from the cable support 10. For example, as shown in FIG. 1, the cable support 10 is located on the front wall of a building and the vehicle is located on the street. A vehicle can be any means of transport. Vehicles include, but are not limited to, road and rail vehicles, marine vehicles, surface and underwater vessels, aircrafts and spacecrafts, depending on the type of building or a structure on which the support 10 is provided. Examples of structures include but are not limited to lampposts, mailboxes, phone boxes and similar street furniture, for example, street benches and shelters. FIG. 15 shows the cable support 10 within a pipe 200, being in use in the same manner.

In some embodiments, the cable 70 comprises an electrical supply cable which is used to supply electricity from a charging point to a vehicle, for example, an electric vehicle (EV). In some embodiments, the electricity supplied is used to charge internal batteries. Electric vehicles include, but are not limited to, road and rail vehicles, surface and underwater vessels, electric aircraft and electric spacecraft. An electric vehicle uses an electric propulsion system or a hybrid electric propulsion system. In some embodiments, the cable support 10 is configured to support only the electrical cable 70 for charging an electric vehicle but in some other embodiments additionally or alternatively provides support for other types of cable (for example, data connectivity). Examples of so-called "mains" electricity supplied via the cable 70 comprises electricity accessed from any one or more points of the power grid, such as, but not limited to, the house, local power substation and/or power transformer. The embodiment of FIG. 1 shows the electricity being supplied via the mains electrical supply of a residential building such as a house.

The cable support 10 is designed primarily to be mountable on a side of a building. In some embodiments, the exterior of the cable support 10 is designed to be aesthetically sympathetic when mounted to the existing building infrastructure, which is especially desirable when it is publicly visible (for example, from street level). Although the cable support 10 is envisioned to be suitable for mounting on a building which is a residential housing, in some embodiments, it is mountable on the side of an industrial building. In some other embodiments, the cable support 10 is mountable on an erected structure. The erected structure includes, but are not limited to, a street furniture such as lamppost, a steel construction or the like. The cable support 10 is mounted above ground level such that the cable support 10 is out of the way, leaving the ground underneath it to be cleared for other usages, such as access to the building. The mountable arrangement provides a compact and safe location for the cable support and for the cable.

FIGS. 2 to 5 show a diagram of the cable support 10. The cable support 10 comprises an elongate supporting structure 40 configured for attachment to a vertical surface. In some embodiments, the vertical surface is a side of a building. In some other embodiments, the vertical surface is a side of an erected structure. The vertical surface is described as a side of a building by way of an example. The elongate supporting structure 40 is mountable. The elongate supporting structure 40 ensures that the cable support 10 is securely mounted on a building.

In some embodiments, the elongate supporting structure 40 is integral to a housing of the cable support 10. The elongate supporting structure 40 may be integral to a pipe in which the cable support 10 is housed. In this way, the cable support 10 can be affixed to the side of a building without any significant modification of the building.

Figures 4, 5:
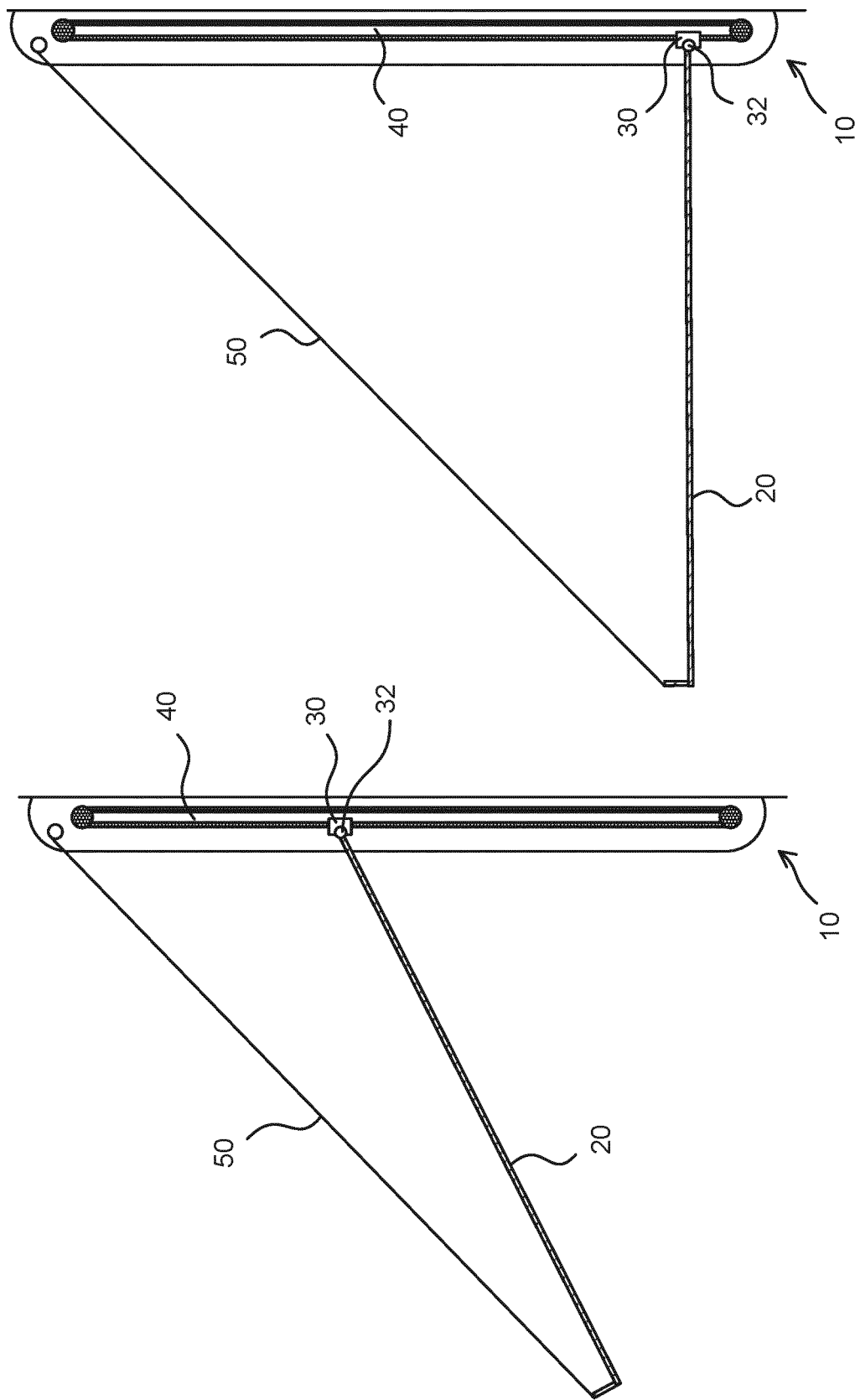
Figure 8:
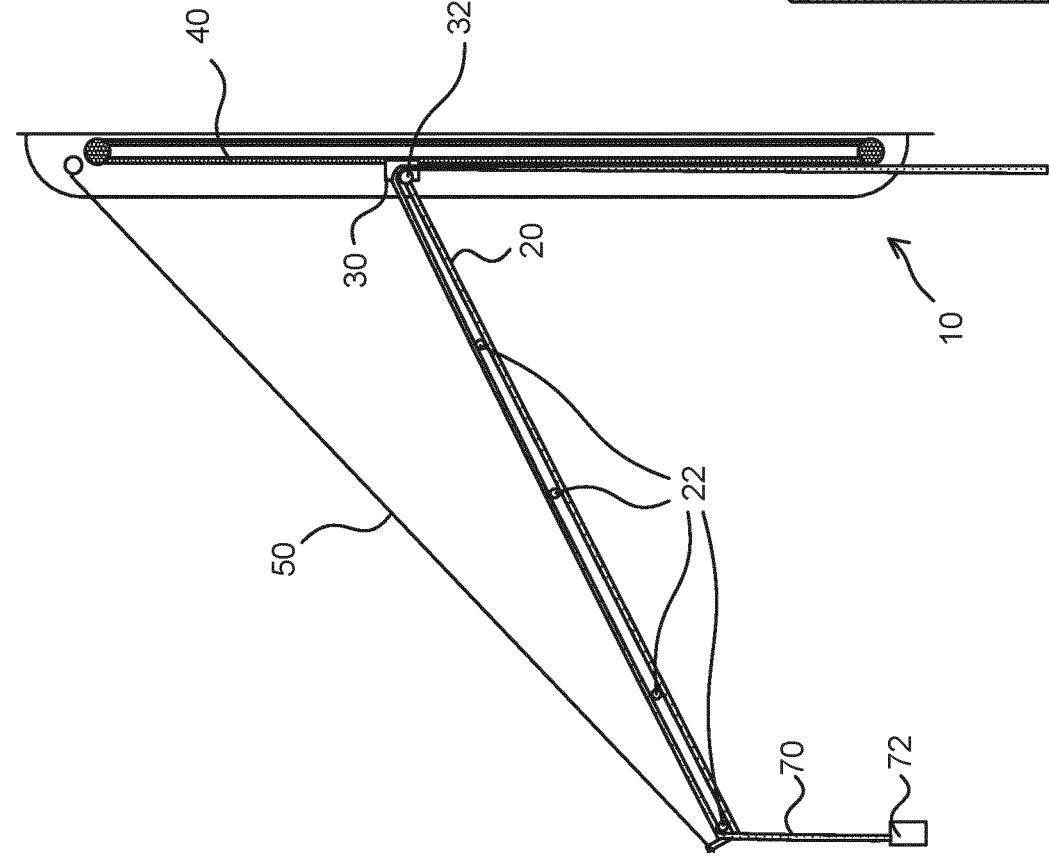
FIG. 8 shows a full deployment of the cable support and the cable according to at least one embodiment of the present invention.
Figure 13:
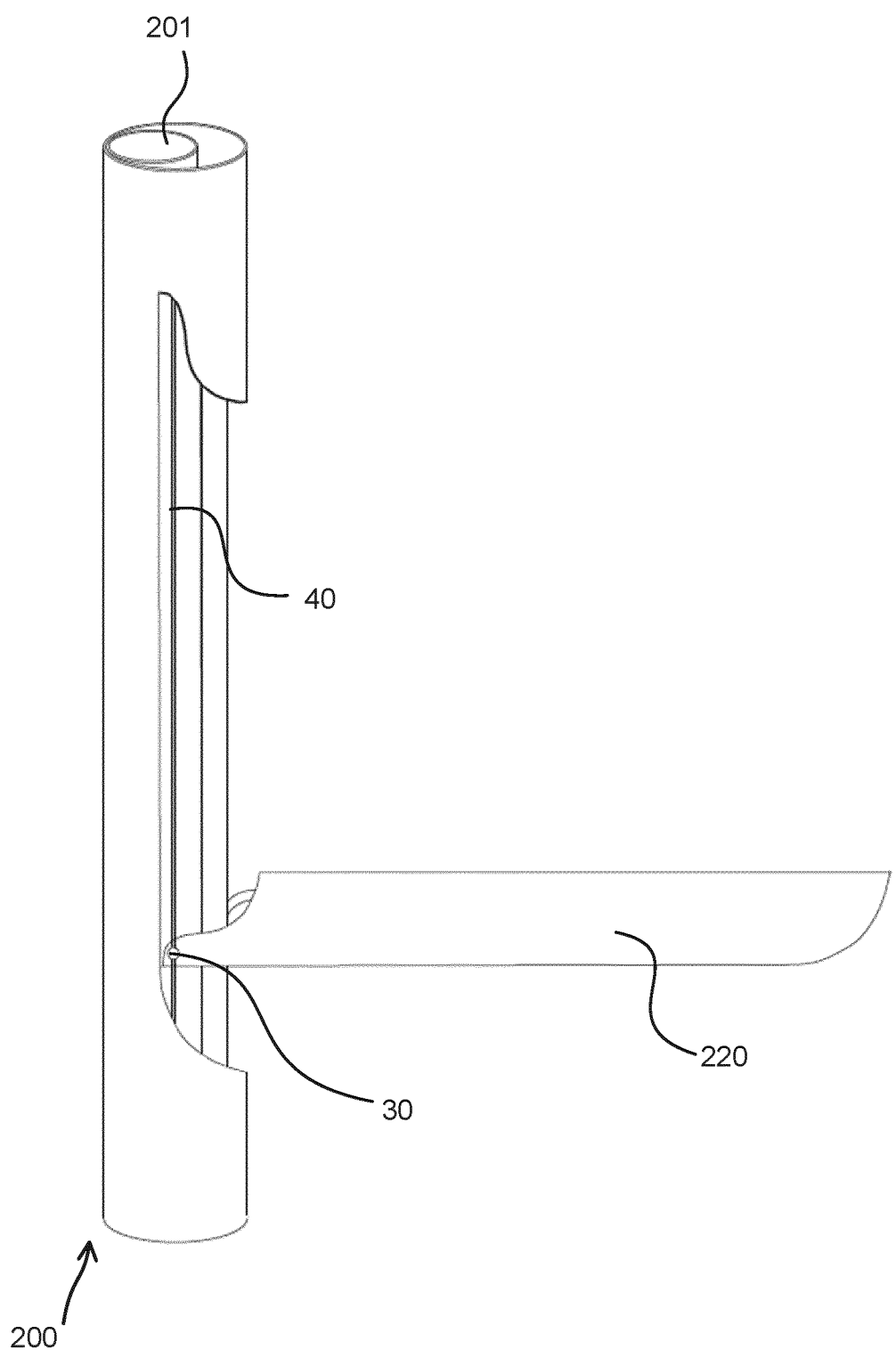
FIG. 13 shows a fully deployment of the cable support according to at least one embodiment of the present invention.

The cable support 10 comprises a boom arm 20 for supporting a cable 70. The boom arm 20 is arranged to slide along at least a portion of the elongate supporting structure 40. In some embodiments, the boom arm 20 is arranged to slide along the full length of the elongate supporting structure 40. As can be seen in FIGS. 5 and 8, in at least one embodiment, the boom arm 20 is in a fully deployed position after sliding along the full length of the elongate supporting structure 40. FIG. 13 shows a fully deployed position of the boom arm 20, wherein a pipe comprises the cable support 10.

In the sequence of Figures from 2 to 5, the deployment of the boom arm 20 is illustrated. The boom arm 20 is deployed for use by sliding down along at least a portion of the elongate supporting structure 40 as the boom arm 20 rotates outwards from the elongate supporting structure 40 to provide lateral support for the cable 70. The boom arm 20 slides down along at least a portion of the elongate supporting structure 40 and concurrently rotates outwards from the elongate supporting structure 40. The angle between the boom arm 20 and the elongate supporting structure 40 increases as the boom arm 20 is deployed. On a full deployment of the boom arm 20, the angle created is substantially 90 degrees. As a result, the boom arm 20 is substantially horizontal to the ground when it is fully deployed.

Figure 2:
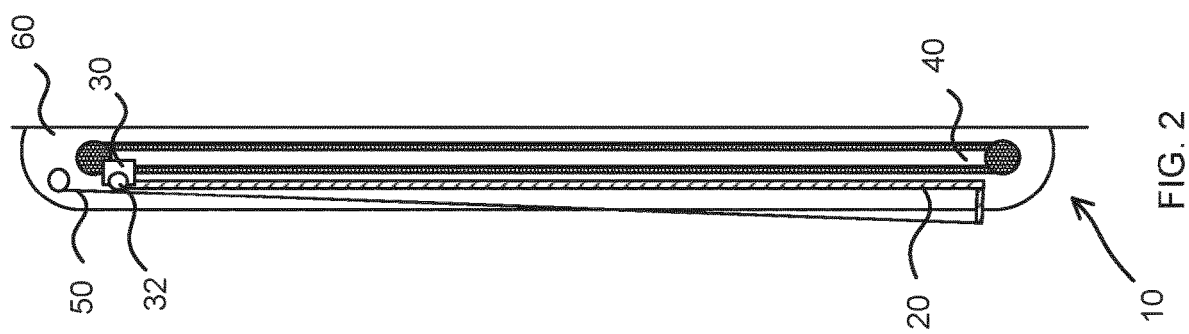

In the sequence of FIGS. 5 to 2, the retraction of the boom arm 20 is illustrated. For retraction, the boom arm 20 slides upwards along at least a portion of the elongate supporting structure 40 as the boom arm 20 rotates inwards towards the elongate supporting structure 40. In some embodiments, the boom arm 20 slides upwards along the full length of the elongate supporting structure 40. The boom arm 20 slides upwards along at least a portion of the elongate supporting structure 40 and concurrently rotates inwards towards the elongate supporting structure 40. The angle between the boom arm 20 and the elongate supporting structure 40 decreases as the boom arm 20 is retracted. On a stowed position both the boom arm 20 and the elongate supporting structure 40 are substantially vertical.

These arrangements ensure that the radius of movement of the boom arm 20 during its operations (whether it is being deployed or retracted) is minimised and restricted. The movement of the boom arm 20 is close to the elongate supporting structure 40, hence close to the building. This ensures that when the boom arm 20 is activated (to deploy or to retract) and especially in its fully deployed position, the boom arm 20 is not obstructed by obstacles such as overhanging tree branches or power cables which may exist closer to the building (see FIG. 11).

In some embodiments, the rate at which the boom arm 20 extends or retracts laterally as it slides along the supporting structure 40 is adjustable. The rate is manually determined or, alternatively, the rate is automatically determined. In some embodiments, there is maximum rate in which the boom arm 20 can extend and retract. In some embodiments, this maximum rate is a predetermined value. The adjustable rate provides the user with further control of the movements of the boom arm 20. In this way, the boom arm 20 can be navigated around a particularly tricky obstacle.

In some embodiments, the boom arm 20 further extends and retracts laterally when it is fully deployed. In some embodiments, the boom arm 20 is telescopic. This way the boom arm 20 can provide its support for the cable 70 to a further distance and reaching further out.

The cable support 10 comprises a slidable pivot 30 for supporting the boom arm 20. The slidable pivot 30 slides downwards along the length of the elongate supporting structure 40 during deployment of the boom arm 20. The movement of the slidable pivot 30 during deployment of the boom arm 20 can be seen in FIGS. 2 to 5. The slidable pivot 30 is connected to the boom arm 20 and to the elongate supporting structure 40. A proximal end of the boom arm 20 is attached to the slidable pivot 30. The elongate supporting structure 40 accommodates the slidable pivot 30 and its mechanism.

In some embodiments, the slidable pivot 30 supports the boom arm 20 and slides upwards along at least a portion of the elongate supporting structure 40 as the boom arm 20 rotates inwards towards the elongate supporting structure 40.

In some embodiments, the rate at which the slidable pivot 30 pivots as it slides along the elongate supporting structure 40 is adjustable. The rate is manually determined or alternatively, the rate is automatically determined. In some embodiments, there is maximum rate in which the boom arm 20 can extend and retract. In some embodiments, this maximum rate is a predetermined value. The adjustable rate provides the user with further control of the movement of the slidable pivot 30 and therefore the movements of the boom arm 20. In this way, the boom arm 20 can be navigated around a particularly tricky obstacle. The rate at which the boom arm 20 extends or retracts laterally as it slides along the supporting structure 40 is independent of the rate at which the slidable pivot 30 pivots as it slides along the elongate supporting structure 40 in some embodiments. Users can control the vertical and lateral rate according to their personal preferences in some embodiments.

The slidable pivot 30 supports the weight of the boom arm 20. The slidable pivot 30 also supports the movement of the boom arm 20 during deployment, retraction and stowage of the boom arm 20. In some embodiments, the cable support 10 comprises a plurality of the slidable pivot 30.

Figure 10:
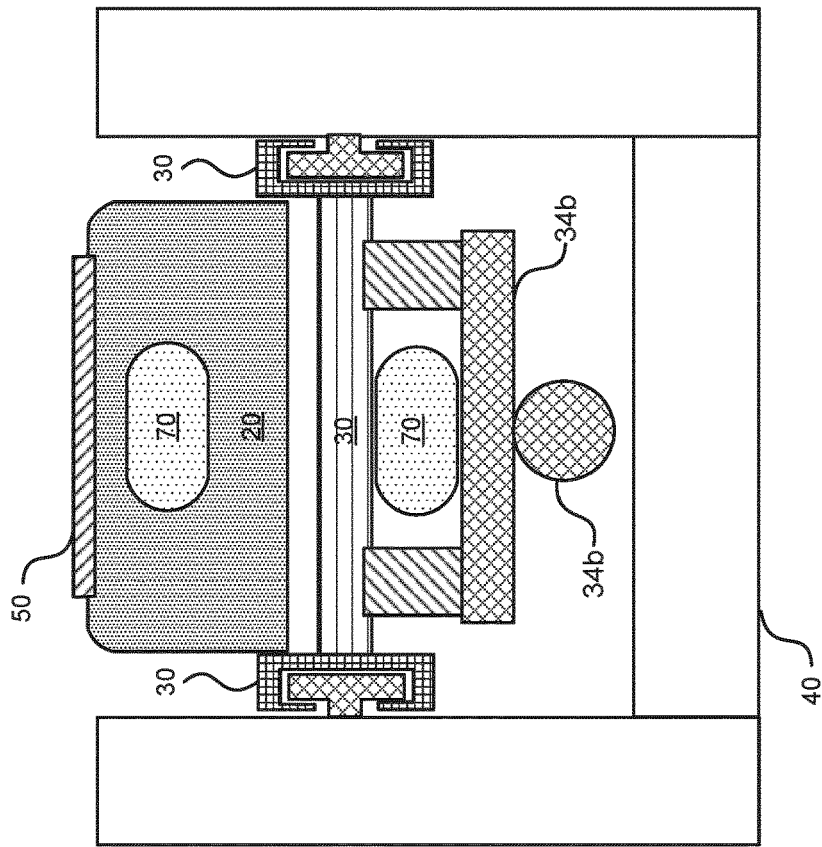
FIG. 10 shows a diagram of cross-section of the cable support according to at least one embodiment of the present invention.
Figure 9:
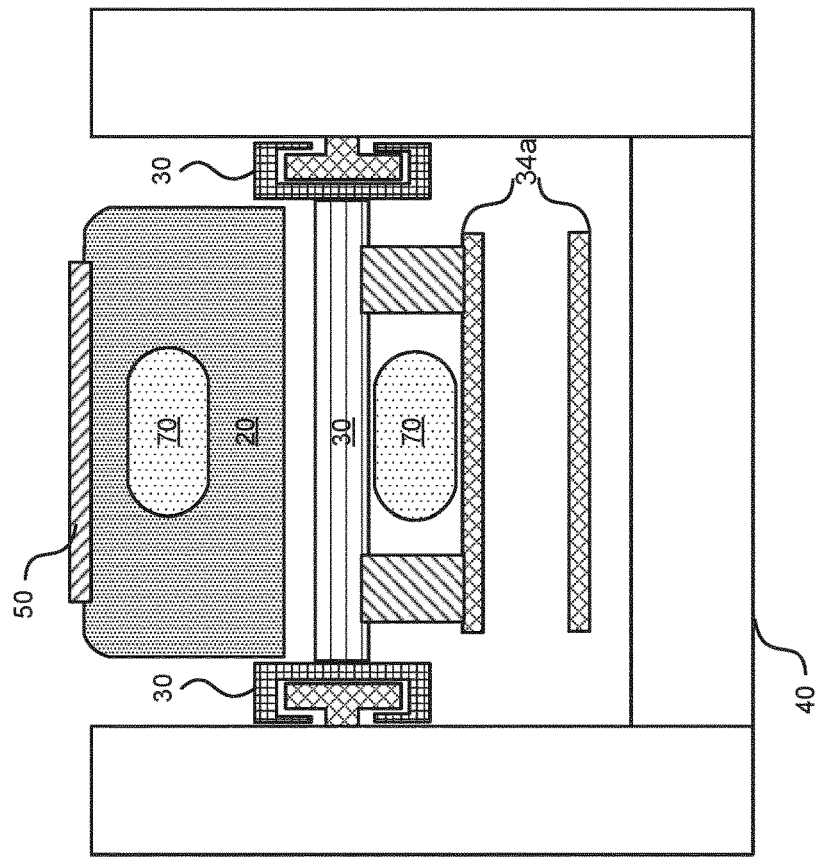
FIG. 9 shows a diagram of cross-section of the cable support according to at least one embodiment of the present invention.
Figure 12:
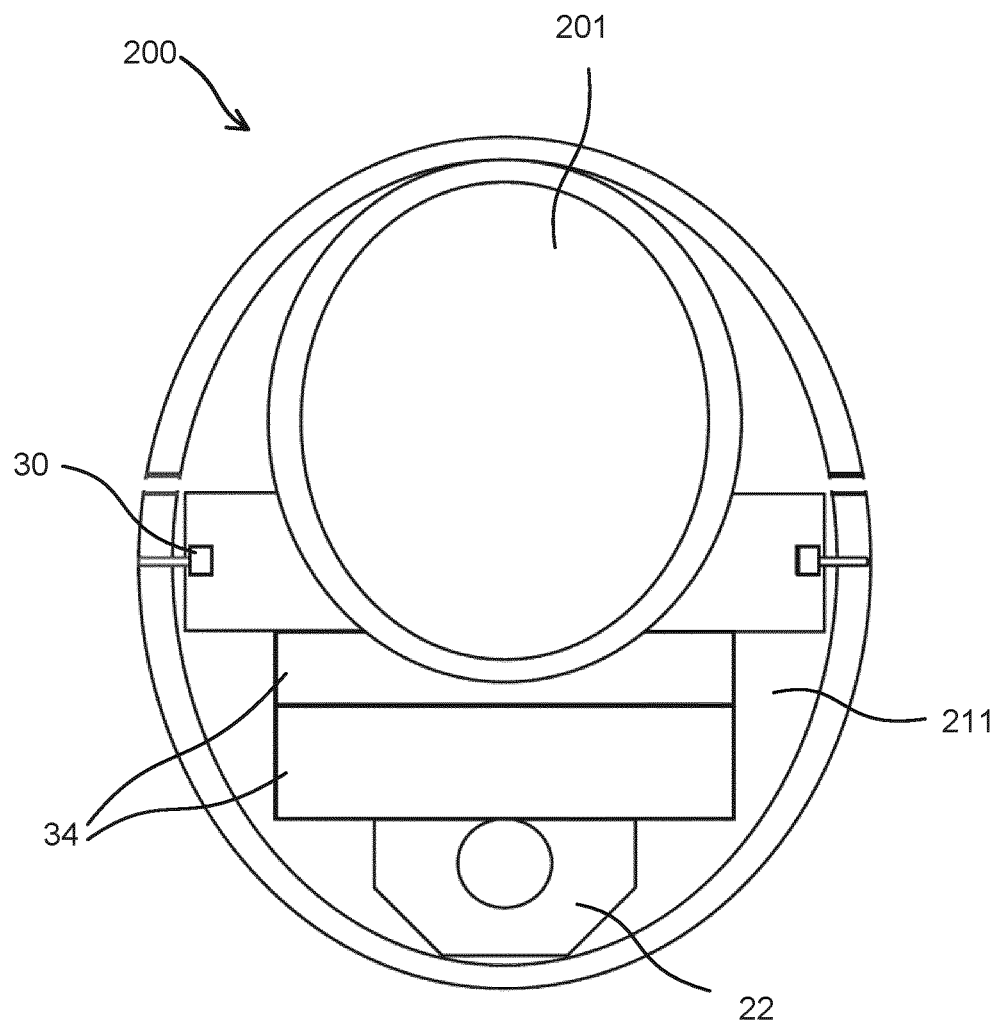
FIG. 12 shows a diagram of cross-section of a pipe comprising the cable support according to at least one embodiment of the present invention.

In some embodiments, for example, such as the embodiments illustrated in FIGS. 9 and 10, the cable support 10 comprises a driving mechanism 34a, 34b. The driving mechanism 34a, 34b is arranged to provide means to move the slidable pivot 30 along at least the portion of the elongate supporting structure 40 such that the boom arm 20 is deployed and retracted. The driving mechanism 34a, 34b is disposed on the elongated support structure 40. In some embodiments, the driving mechanism 34a, 34b comprises a self-belt retractor 34a and in some other embodiments, the driving mechanism comprises a motorised lead screw 34b. The driving mechanism 34a, 34b, such as self-belt retractor 34a and the motorised lead screw 34b, is operated to carry the slidable pivot 30 along at least portion of the elongate supporting structure 40. FIGS. 9 and 10 show the cross-section of embodiments of the cable support 10. In FIG. 12, the driving mechanism has been indicated as 34.

In some embodiments, for example, such as the embodiments shown schematically in FIGS. 2 to 5, the cable support 10 comprises a boom support 50, or similar structure providing support for the weight of the boom arm 20 and cable in use, and also as the boom arm 20 is deployed and/or retracted. In use, the boom support 50 is attachable to the vertical surface (not shown), or to the elongate supporting structure 40, or to both. The boom support 50 shown in the accompanying Figures is connected to a distal end of the boom arm 20. However, use of a boom support 50 is not included or required in all embodiments. The boom support 50 provides support to the boom arm 20 in various positions. In some embodiments, the boom support 50 comprises a strap, or similar structure which provides the weight of the boom arm 20 with a further support in addition to the support provided by the slidable pivot 30. Furthermore, the movement of the boom arm 20 during deployment and retraction is also supported and guided appropriately.

Figure 6:
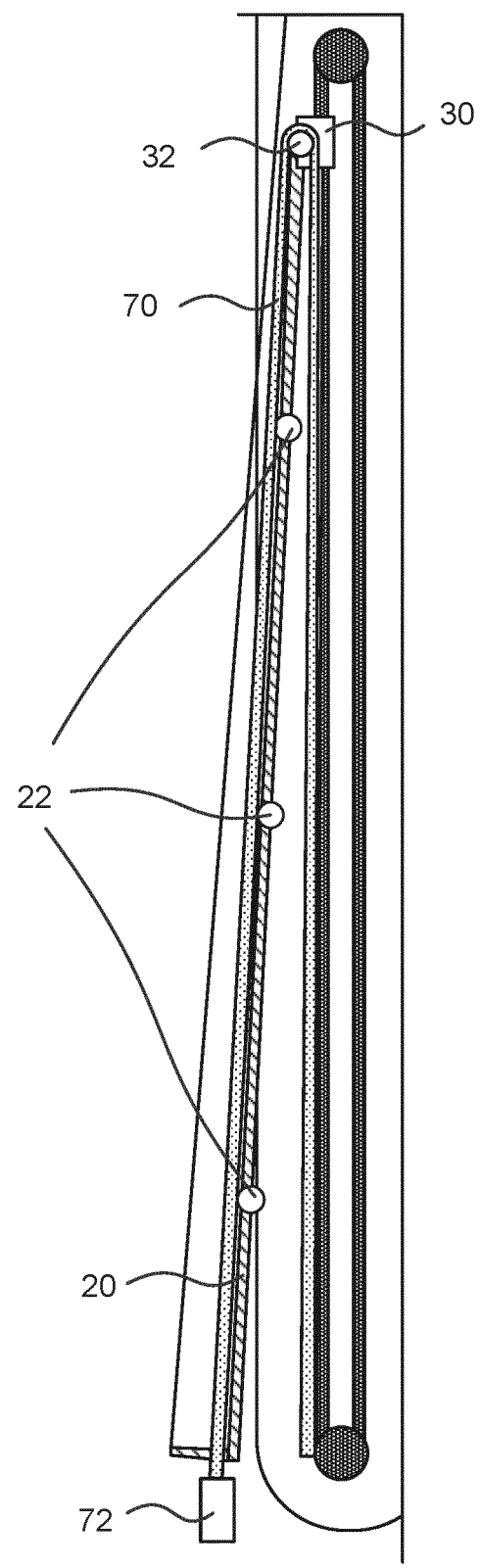
FIG. 6 shows the cable support with a cable according to at least one embodiment of the present invention.
Figure 7:
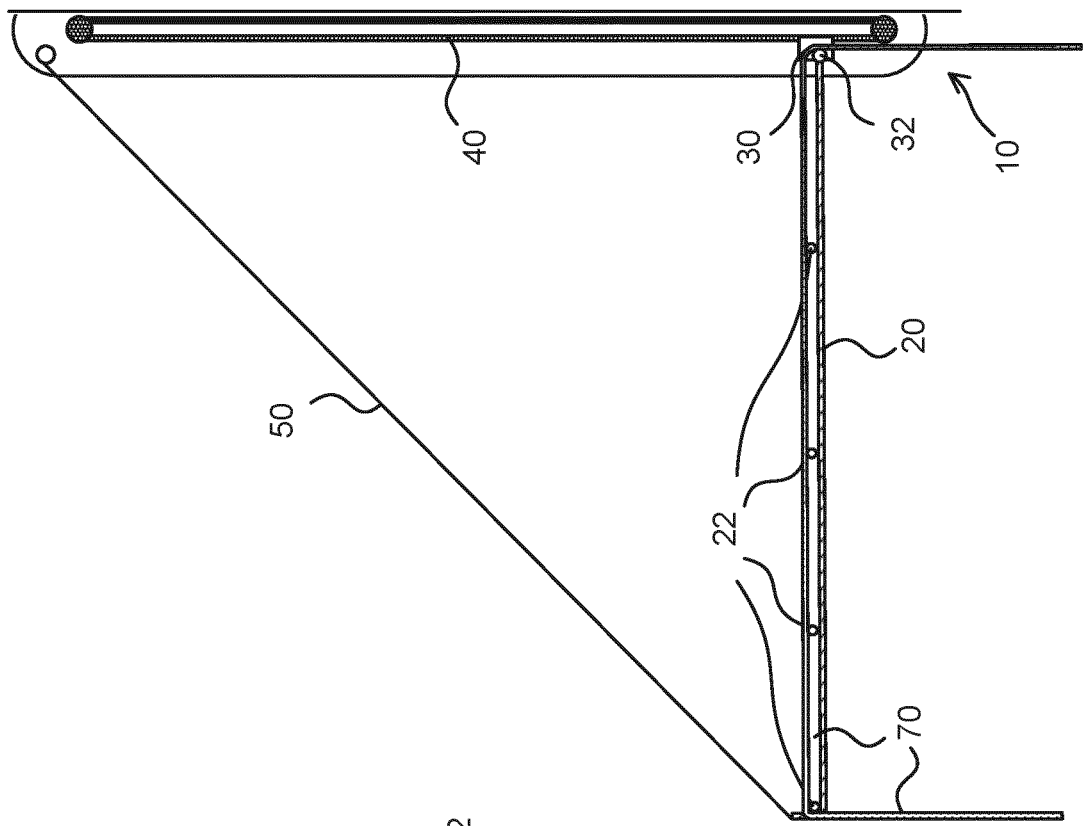
FIG. 7 shows a partial deployment (or retraction) of the cable support and the cable according to at least one embodiment of the present invention.

In some embodiments, for example, such as the embodiments illustrated in FIGS. 6 to 8, the cable support 10 comprises a first guide 22 which is disposed on the boom arm 20. The first guide 22 is arranged to support the movement of the cable 70 during the deployment and retraction of the boom arm 20. The first guide 22 is disposed at the distal end of the boom arm 20. In some embodiments, the first guide 22 holds one end of the cable 70 when the boom arm 20 is stowed. When the boom arm 20 is deployed the cable 70 moves with the boom arm 20. As the boom arm 20 extends the first guide 22 ensures that the cable 70 also moves with the boom arm 20. The first guide 22 holds a connector end of the cable 70. In some embodiments, the connector end of the cable 70 is the end of the cable attached to a connector 72 which is configured to couple with a connector of the vehicle. In some embodiments, a plurality of the first guide 22 is disposed along the length of the boom arm 20. In this way, the cable 70 can be supported along the length of the boom arm 20, making it easy to guide the cable 70 along when the boom arm 20 is deployed or retracted. In some embodiments, the first guide 22 is a roller A roller ensures smooth delivery of the cable 70 and prevents any damages to the cable 70 during deployment and retraction of the boom arm 20.

In some embodiments, for example, such as the embodiments as shown in FIGS. 6 to 8, the cable support 10 comprises a second guide 32 which is disposed on the slidable pivot 30. The second guide 32 is arranged to support the movement of the cable 70. The second guide 32 provides support to the cable 70 during the deployment and retraction of the boom arm 20. In some embodiments, the second guide 32 is a roller. Alternatively, in some embodiments the second guide 32 is a pulley. In this way the cable 70 is not damaged when the cable 70 is being deployed or retracted. The cable 70 can be delivered smoothly. Use of pulley as a second guide also provides further means to guide the cable 70 during the deployment and retraction of the boom arm 20. The pulley also provides more time efficient mechanism to guide the cable 70 through the cable support 10.

In some embodiments, the cable support 10 comprises a housing 60. The housing 60 is arranged to enclose the cable support 10 such that the elongate supporting structure 40, the boom arm 20 and the slidable pivot 30 are enclosed within the housing 60 when the boom arm 20 is stowed. In this way storage of the cable support 10 is compact.

In some embodiments, the housing 60 comprises a cavity for storing at least a portion of the cable 70. In this way the cable 70 is always housed and neatly stored. The housing 60 comprise various forms to store at least a portion of the cable 70. The at least a portion of the cable 70 may be stored at least a portion of the length of the housing 60, at one side of the housing 60, or both. For example, in some embodiments, the cable 70 is stored at the bottom end of the housing 60. Alternatively, in some embodiments, the cable 70 is stored at least a portion of the length of the housing 60 and the storage cavity. In some embodiments, the housing 60 is an integral portion of a pipe. The cable support 10 is arranged to fit within a pipe.

In some embodiments, the cable support 10 comprises one or more magnetic elements (not shown) which are disclosed along the inside of the housing 60 of the cable support. The magnetic element may be one strip of magnet or, alternatively, the magnetic element may be a plurality of magnet placed in an alignment. In some embodiment, the one or more magnetic elements is disposed along at least a portion of the elongate support structure 40. In some embodiments, the one or more magnetic elements is disposed along the length of the elongate support structure 40. The one or more magnetic elements are arranged to hold the cable 70 in place until the cable 70 is deployed or retracted the cable 70. The cable 70 is held at a predetermined location within the cable support 10. The magnetic elements hold the cable 70 in place when the cable support 10 is in a stowed position. When the slidable pivot 30 moves down the cable 70 is peeled from its position along the inside of the housing 60. When the slidable pivot moves upwards, the cable 70 is retracted and guided into its position inside the housing 60 attaching to the one or more magnetic elements. The number of magnetic elements may be determined based on the length of the elongate support structure 40 or the housing 60.

In some embodiments, the deployment and/or retraction of the boom arm is manually or automatically controllable. In some embodiments, the deployment and/or retraction of the boom arm is remotely controllable. An electronic device such as a fob, a mobile device, a laptop, a tablet, a wearable device may be able to control the cable support 10. The vehicle may be used to control the cable support via its user interface. The control code may be transmitted via different communication protocol, such as but not limited to Wi-Fi and Bluetooth.

In some embodiments, an image sensor is mounted on the housing 60 of the cable support 10. This is to deter vandalism and for crime prevention. The image sensor may be a video recording camera, Infrared (IR) camera or any type of sensor that can detect a motion. In some embodiments, the image sensor is mounted on the elongate supporting structure 40. The images may be transmitted via different communication protocol, such as but not limited to Wi-Fi.

In the above description of the cable support 10, in some embodiments, the cable support 10 is stored, when not in use within a housing 60 which may have a secondary functionality, for use as a downpipe for rainwater or the like. Such structures are commonly found on the exterior of buildings and as such are permitted under government regulations which are administered by local government authorities such as and the like who maintain responsibility for zoning, planning, and building control. In some example embodiments, the housing 60 comprises a pipe for drainage of water, for example, for drainage of wastewater from one or more the upper stories of a building or the roof of the building. In this way, the cable support 10 is fully disguised as a downpipe for rainwater, a soil vent pipe or other appendages on the side of a building.

In some embodiments the pipe for drainage comprises the cable support 10. The pipe may enclose the cable support 10 and the cable 70 within its cavity. The dual-purpose pipe then acts as a drainage and a housing for the cable support 10 and the cable 70.

In some examples, the pipe is twin-walled, in which case, the pipe 200 has an interior inner cavity 201 (for example, through which water can flow) which is separated by an inner wall from an outer cavity 211 within which the cable 70 and/or support structure is located. The outer cavity 211 may in some examples of the pipe have an elongated aperture so that the boom arm 20 to be deployed outwards as the slidable pivot 30 moves slidably down either within or outside of the outer cavity of the pipe.

FIG. 12 shows a cross-section of an example of the pipe 200 comprising the cable support 10. The cross-section of the pipe 200 is an oval shape. This shape may vary depending on the functionality and aesthetics needs. The pipe 200 comprises the driving mechanism 34. In some embodiments the driving mechanism 34 is the self-belt retractor 34a as shown in FIG. 9. In some embodiments the driving mechanism 34 is the motorised lead screw 34b as shown in FIG. 10. The driving mechanism 34 is operated to carry the slidable pivot 30 along at least portion of the elongate supporting structure 40. In some embodiments, the elongate supporting structure 40 is integral to the pipe 200, such that a portion of the pipe 200 forms the elongate supporting structure 40.

The pipe 200 comprises a first guide 22 which is disposed on the boom arm 20 (the boom arm is not shown in FIG. 12). The first guide 22 is arranged to support the movement of the cable 70 during the deployment and retraction of the boom arm 20. The first guide 22 is disposed at the distal end of the boom arm 20. In some embodiments, the first guide 22 holds one end of the cable 70 when the boom arm 20 is stowed. When the boom arm 20 is deployed the cable 70 moves with the boom arm 20. As the boom arm 20 extends the first guide 22 ensures that the cable 70 also moves with the boom arm 20. The first guide 22 holds a connector end of the cable 70. In some embodiments, the connector end of the cable 70 is the end of the cable attached to a connector 72 which is configured to couple with a connector of the vehicle.

FIGS. 14a and 14d show the pipe 200 and the portion of the pipe 220 which moves with the boom arm 20 from different angles. FIG. 14b shows an example of the boom arm 20 which is attachable to the pipe 200. FIG. 14c shows the pipe from a different angle where the boom arm 20 and the portion of the pipe 220 which aligns with the boom arm 20 when in use are not visible. This side of the pipe 200 will be attached to the wall of the wall. In some embodiments, the portion of the pipe 200 forms the boom arm 20 such that the portion 220 of the pipe may operate as the boom arm 20.

Although not shown in the figures, the pipe 200 comprises all the features of the cable support 10. The pipe may have different combinations of the features of the cable support 10. The pipe 200 provides all the functionality of the cable support 10. In some embodiments, at least some the portions of pipe 200 form the cable support 10 and operate as the cable support 10.

A system for charging an electric vehicle comprises a cable 70 comprising a connector 72, the connector is configured to couple with a vehicle and deliver electrical charges to the vehicle; and a cable support 10 comprising an elongate supporting structure 40 configured for attachment to a vertical surface; a boom arm 20 for supporting a cable 70, wherein the boom arm 20 is arranged to slide along at least a portion of the elongate supporting structure 40 and is deployed for use by sliding down along at least a portion of the elongate supporting structure 40 as it rotates outwards from the supporting structure 40 to provide lateral support for the cable 70; a slidable pivot 30 supporting the boom arm 20 and slides downwards along the length of the supporting structure 40 during deployment of the boom arm 20.

In some embodiments, the slidable pivot 30 supports the boom arm 20 and slide upwards along at least a portion of the elongate supporting structure 40 as the boom arm 20 rotates inwards towards the supporting structure 40.

In some embodiments, the rate at which the boom arm 20 is extends and retracts laterally as the boom arm 20 slides along the supporting structure 40 is adjustable.

In some embodiments, the system for charging an electric vehicle comprises a second guide 32 which is disposed on the slidable pivot 30, wherein the second guide 32 is arranged to support the movement of the cable 70 during the deployment and retraction of the boom arm 20.

In some embodiments, the system for charging an electric vehicle comprises the cable support 10 described throughout this description.

In some embodiments, one or more of the features described in relation to the examples of cable supports in the above description is present in the cable support used in the examples of a system for charging an electric vehicle described above.

At least one embodiment of the operation of the cable support 10 is described. When a user activates the boom arm 20 to be deployed using an electronic device such as a mobile phone, the boom arm 20 is deployed from its stowed position. The boom arm 20 slides along the elongate supporting structure 40 and rotates outwards from the supporting structure 40. During this deployment, a slidable pivot 30 provides support to the boom arm 20 and slides downwards along the length of the elongate supporting structure 40. A cable 70 is stowed inside a housing 60 of the cable support 10. The cable 70 is stored at a designated cavity within the housing 60, such as a bottom end of the housing 60, along the length of the housing 60 or both. The housing 60 may be a pipe. The pipe may be drainage pipe attached to the side of a house. An end of the cable 70 on which a connector 72 is attached is held by a first guide 22 at the distal end of the boom arm 20 such that when the boom arm 20 slides along the elongate supporting structure 40 and rotates outwards, the cable 70 is carried. A plurality of the first guide 22 may be disposed along the length of the boom arm 20 such that the cable 70 may move along the boom arm with less friction. The cable 70 is also supported and its movement is guided by a second guide 32 disposed on the slidable pivot 30. As can be seen in FIGS. 7 and 8, as the slidable pivot 30 slides downwards the cable 70 is also guided to extend out towards the distal end of the boom arm 20 so that the cable 70 is reachable by the user for use. If the cable 70 is stored along the length of the housing 60, the displaced cable length would approximately equal to the length of the cable 70 being stored along the length of the housing 60. When the boom arm 20 is fully rotated to be substantially horizontal to the ground, the boom arm 20 may further extend laterally, carrying the cable 70 that the cable 70 can reach further out with a firm support.

When the user activates the boom arm 20 to be deployed using an electronic device such as a mobile phone, the boom arm 20 is retracted from its fully deployed position. If the boom arm 20 has extended laterally, the boom arm 20 starts to retract to a default length. When the boom arm 20 is at its default length, the boom arm 20 slides upwards along at least a portion of the elongate supporting structure 40 and concurrently the boom arm 20 rotates inwards towards the supporting structure 40. The slidable pivot 30 provides support to the boom arm 20 allowing for the boom arm 20 to slide upwards the elongate supporting structure 40 and rotate. During this retraction the cable 70 retracts with the boom arm 20 such that the excess cable 70 is not snagging. The cable 70 returns to its storage. When the boom arm 20 reaches substantially vertical position and the slidable pivot 30 returns to its default position the cable support 10 is being stowed and inactivated. The default position of the slidable pivot 30 may be towards the top of the cable support 10. The slidable pivot 30 ensures that the boom arm 20 is fully retracted. The boom arm 20 may be fully enclosed within the housing 60 of the cable support 10.

Figure 11:
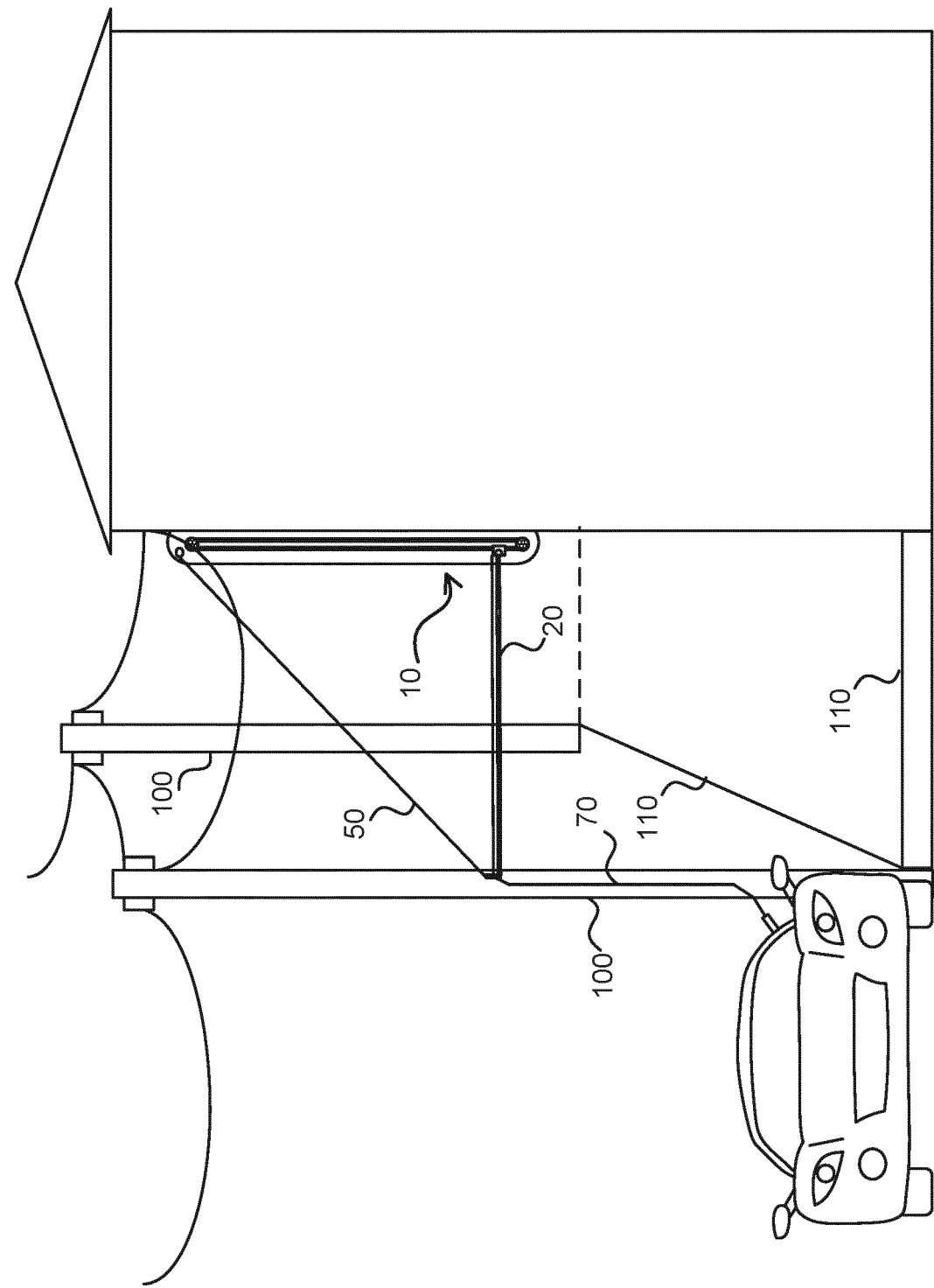
FIG. 11 shows the cable support according to at least one embodiment of the present invention in use where obstacles are present

FIG. 11 is similar to FIG. 1 but shows example obstacles 100 which the cable support 10 must avoid when the boom arm 20 is deployed to charge a vehicle. In the example shown in FIG. 11 of the cable support 10, the cable support 10 is shown extending in front of a first pole 100 of two poles 100 located at the kerb side 110 (for example on the pavement) supporting overhead power cables, such that in order to deploy the boom arm 20, the cable support 10 is extended below the overhanging power cables as the boom arm 20 laterally extends towards the vehicle.

Whilst the embodiments disclosed herein relate generally to use of a charging system for vehicles, it can be used for providing electrical power and/or charging other equipment whilst located in a street type environment. In some examples, the cable support could be adapted to support hose or cable or the like for other purposes in a street type environment including, but not limited, in some examples, to providing water for cleaning and irrigation. The charging system may also be provided as a power supply for other purposes such as using an electrical equipment in a street scene environment, e.g. for power tools, street parties, lighting, including Christmas decorations.

A person skilled in the art would appreciate that the drawings are not necessarily to the scale and may differ in their proportion and perspective from actual embodiments of the invention.

The invention claimed is:

1. A cable support comprising:
   an elongate supporting structure configured for attachment to a vertical surface;
   a boom arm for supporting a cable, wherein the boom arm is arranged to slide along at least a portion of the elongate supporting structure and is deployed for use by sliding down along at least a portion of the elongate supporting structure as the boom arm rotates outwards from the supporting structure to provide lateral support for the cable;
   a slideable pivot for supporting the boom arm and sliding downwards along the length of the supporting structure during deployment of the boom arm; and
   a first guide which is disposed on the boom arm, wherein the first guide is arranged to support the movement of the cable during the deployment and retraction of the boom arm.

2. The cable support as claimed in claim 1, wherein the cable support is configured to support an electrical cable for charging an electric vehicle.

3. The cable support as claimed in claim 1, wherein the slideable pivot supports the boom arm and slides upwards along at least a portion of the elongate supporting structure as the boom arm rotates inwards towards the supporting structure.

4. The cable support as claimed in claim 1, wherein a rate at which the boom arm extends and retracts laterally as the boom arm slides along the supporting structure is adjustable.

5. The cable support as claimed in claim 1, comprising a boom support, wherein the boom support is attachable to the vertical surface and/or the elongate supporting structure and is connected to a distal end of the boom arm supporting the boom arm in various positions.

6. The cable support as claimed in claim 1, wherein the first guide is a roller.

7. The cable support as claimed in claim 1, comprising a second guide which is disposed on the slideable pivot, wherein the second guide is arranged to support the movement of the cable during the deployment and retraction of the boom arm.

8. The cable support as claimed in claim 1, comprising a driving mechanism which is arranged to provide means to move the slideable pivot along at least the portion of the elongate supporting structure such that the boom arm is deployed and retracted.

9. The cable support as claimed in claim 1, comprising a housing which encloses the cable support such that the elongate supporting structure, the boom arm and the slideable pivot are enclosed within the housing when the boom arm is stowed.

10. The cable support as claimed in claim 1, comprising one or more magnetic elements which are disposed along the elongate support structure.

11. The cable support as claimed in claim 10, wherein the housing comprises a cavity for storing at least a portion of the cable.

12. The cable support as claimed in claim 10, wherein the housing is an integral portion of a pipe.

13. The cable support as claimed in claim 1, wherein the deployment and/or retraction of the boom arm is manually or automatically controllable.

14. The cable support as claimed in claim 1, wherein the deployment and/or retraction of the boom arm is remotely controllable.

15. A pipe for drainage comprising the cable support as claimed in claim 1.

16. A system for charging an electric vehicle comprising:
- a cable comprising a connector, the connector is configured to couple with a vehicle and deliver electrical charges to the vehicle; and
- a cable support comprising:
- an elongate supporting structure configured for attachment to a vertical surface;
- a boom arm for supporting a cable, wherein the boom arm is arranged to slide along at least a portion of the elongate supporting structure and is deployed for use by sliding down along at least a portion of the elongate supporting structure as it rotates outwards from the supporting structure to provide lateral support for the cable;
- a slideable pivot for supporting the boom arm and slides downwards along the length of the supporting structure during deployment of the boom arm; and
- a first guide which is disposed on the boom arm, wherein the first guide is arranged to support the movement of the cable during the deployment and retraction of the boom arm.

17. The system for charging an electric vehicle as claimed in claim 16, wherein the slideable pivot supports the boom arm and slides upwards along at least a portion of the elongate supporting structure as the boom arm rotates inwards towards the supporting structure.

18. The system for charging an electric vehicle as claimed in claim 16, wherein a rate at which the boom arm extends and retracts laterally as the boom arm slides along the supporting structure is adjustable.

19. The system for charging an electric vehicle as claimed in claim 16, comprising a second guide which is disposed on the slideable pivot, wherein the second guide is arranged to support the movement of the cable during the deployment and retraction of the boom arm.

\* \* \* \* \*